United States Patent [19]

Hiltunen

[11] Patent Number: 4,956,541
[45] Date of Patent: Sep. 11, 1990

[54] CURRENT NOZZLE FOR MIG- AND MAG-WELDING BURNER

[76] Inventor: Ossi Hiltunen, Box 3099, S-19500 Märsta, Sweden

[21] Appl. No.: 399,470
[22] PCT Filed: Feb. 23, 1988
[86] PCT No.: PCT/FI88/00028
§ 371 Date: Aug. 23, 1989
§ 102(e) Date: Aug. 23, 1989
[87] PCT Pub. No.: WO88/06072
PCT Pub. Date: Aug. 25, 1988

[30] Foreign Application Priority Data

Feb. 23, 1987 [FI] Finland .................................. 870749
Feb. 11, 1988 [FI] Finland .................................. 880625

[51] Int. Cl.$^5$ .............................................. B23K 9/24
[52] U.S. Cl. ................................. 219/137.61; 219/136
[58] Field of Search ................. 219/137.61, 137.2, 136

[56] References Cited

U.S. PATENT DOCUMENTS 3,116,408 12/1963 Turbett et al. ................. 219/137.61
3,826,888 7/1974 Garfield et al. ................. 219/137.61

*Primary Examiner*—Clifford C. Shaw
*Attorney, Agent, or Firm*—Pearne, Gordon, McCoy & Granger

[57] ABSTRACT

The invention relates to a current nozzle for a MIG- and MAG-welding burner, comprising a nozzle body (8) having an orifice (9) for the passage of a welding wire (5). The current nozzle is provided with means for automatically turning welding wire (5) and nozzle orifice (9) eccentrically relative to each other as a function of the wearing of nozzle orifice (9). The means for turning welding wire (5) and nozzle orifice (9) relative to each other consist of a coil spring (10) surrounding nozzle body (8), one end of said spring being fastened to nozzle body (8). The other end of said coil spring is provided with a guide opening (11) for allowing said welding wire (5) to travel in axial direction through said guide opening (11).

7 Claims, 2 Drawing Sheets

WATER
WIRE
CURRENT
GAS 0.1

0.1

0.2

PRIOR ART

CURRENT NOZZLE FOR MIG- AND MAG-WELDING BURNER

The present invention relates to a current nozzle for a MIG- and MAG-welding burner, comprising a nozzle body having an orifice for the passage of a welding wire.

FIG. 1 shows the structural principle of a MIG- and MAG-burner generally used at present. FIGS. 2 and 3 are sectional views of the welding current nozzles (0.1 and 0.2) of a conventional MIG- and MAG-burner. Hereinafter, the term MIG and MAG describing a welding practice is replaced by the term MIG only.

What is problematic and requires a lot of maintenance is particularly the point where the welding current is transmitted from the body of a burner to the welding wire. As known in the art, in MIG-welding the additive wire serves also as an electrode, i.e. it conducts the welding current from a burner to a body being welded. The additive wire is passed from a reel through a nozzle, the wire rubbing a current nozzle through the intermediary of an internal straight central surface. After unwinding it from a wire reel, the additive wire is straightened in a wire-forwarding device and, due to its thinness (diameter of solid wire from 0.6 mm to 1.6 mm), the wire is quite flexible, so even though the end of a burner is bent to an angle of 30° to 45° approximately 100 mm upstream of the nozzle, the wire is guided concentrically to a current nozzle. If a current nozzle is made small or narrow, the wire may easily be subjected to an excessive axial load in a wire-forwarding device and thus the wire might buckle.

Furthermore, in an elongated worn-out orifice the current transfer point varies since the contact point is not structurally directed at any particular section in a current nozzle and, in addition, the magnetic forces occurring at least when welding on steels can cause a lateral movement of the wire; thus the passage of welding current to the actual heat delivery point becomes unstable. Although the modern welding machines are provided with sophisticated current regulation equipment, still, as transfer resistance increases, a welding machine first supplies too low a welding current and, after the adjustment, it easily supplies too high a voltage and therefore too high a transient welding current. This leads to blow-through and spatters and also otherwise to a faulty welding result. This is the case especially with a worn-out current nozzle. In short-term welding work, the presently available nozzle has exhibited poor ignitability whereby, e.g. in robotized welding, there will be no joint at all or it will be of poor quality. The increased welding voltage readily heats a wire in the nozzle so that the wire melts, breaks and gets stuck in the nozzle orifice. This interrupts the work and the welder must remove the wire or replace the current nozzle.

Particularly in robot-automated production, the current nozzle disturbances are quite detrimental and further, due to increased welding voltage, there will occur so-called cold flow welding fault; a joint is apparently of good quality but in reality a joint is poor or does not exist at all. A welding problem occurring this way is avoided by frequent replacements of a current nozzle and production must be cut off for those.

An object of the invention is to eliminate or at least to reduce the above problems. In view of fulfilling this object, the invention is characterized by comprising means for automatically turning a welding wire and a nozzle orifice eccentrically relative to each other as a function of the wearing of a nozzle orifice.

An advantage offered by an apparatus of the invention is that the welding current can be conveyed to an additive wire, serving as an electrode and slidably forwarded to a welding point, as near the electric arc as possible.

The invention will now be described with reference made to the accompanying drawings, in which.

Figure 1:
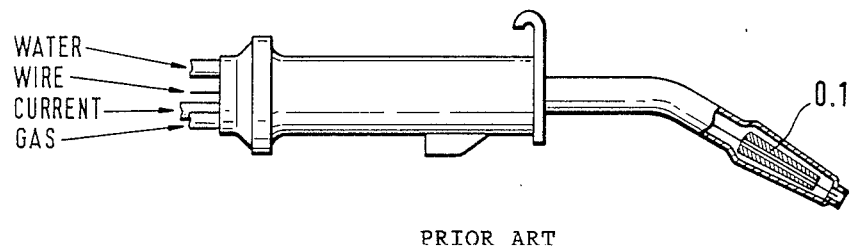
FIG. 1 shows the structural principle of a conventional MIG/MAG-burner.
Figure 2:
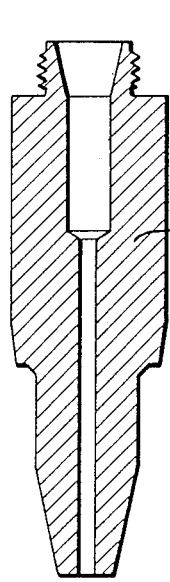
FIGS. 2-3 show conventional nozzles of a MIG/MAG-burner in a sectional view.
Figure 3:
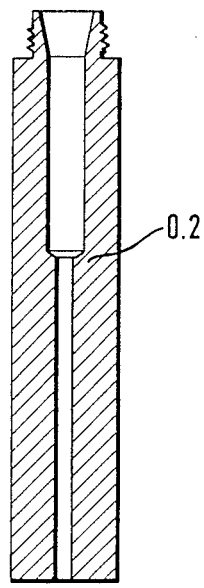
Figure 4:
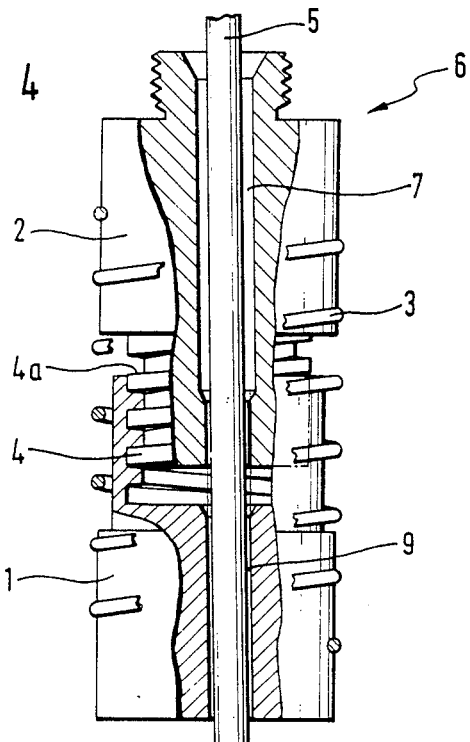
FIG. 4 is a sectional view of a first embodiment of an apparatus of the invention.

FIG. 4 illustrates a solution for subjecting a wire 5 to sufficient contact pressure by making a current nozzle 6 a two-piece component, whereby an orifice 9 in the end 1 facing a welding point and/or an orifice 7 in the body 2 facing a burner handle, said orifices being substantially circular in shape, is eccentric relative to its fastening thread 4, preferably a parallellogram thread. Over the the joint portion is mounted a suitable coil spring 3 which causes a force urging components 1 and 2 away from each other, the welding current passing along the surface 4a of flat thread 4, said surface facing the burner handle and being substantially perpendicular to the nozzle axis, from basic component 2 to tip component 1. For this purpose, at an assembly stage, said spring 3 is preferably given a compressive force causing a torsional stress in the spring wire. The wearing of an orifice in component 1 is compensated for in a manner that component 1 is turning upon a flat thread or the like by the action of a torsional moment (flexural stress in spring wire) given to spring 3 at an assembly stage. Spring 3 is preferably fixedly mounted on body 2 and tip 1. When additive wire 5 is threaded into position, said tip 1 of nozzle 6 is turned against spring 3 and thus, despite the eccentricity of orifices 9 and 7, said wire 5 finds its position. During the adjustment, said current nozzle tip 1 approaches body component 2, whereby the distance of tip component 1 slightly increases from a body being welded supposing that the distance of a gas dome from the body remains constant. The above aspect has no significance regarding the welding result.

Figure 5:
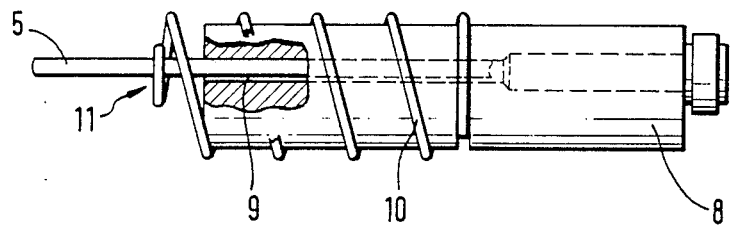
FIG. 5 is a sectional view of a second embodiment of an apparatus of the invention.
Figure 6:
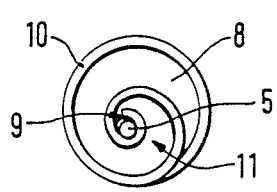
FIG. 6 is an end view of the embodiment shown in FIG. 5, and FIG. 7 illlustrates one embodiment of a detail shown in FIGS. 5 and 6.
Figure 7:
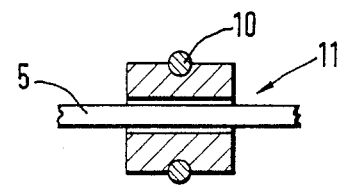

FIGS. 5 and 6 illustrate a second embodiment of an apparatus of the invention with a coil spring 10 fitted around a one-piece nozzle body 8. One end of coil spring 10 is fastened to nozzle body 8 and the other end is provided with a guide opening 11 through which a welding wire 5 can extend in its axial direction. Said guide opening 11 is preferably made of a wear-resisting and electrically non-conducting material, such as ceramics. The guide opening 11 can be made of a separate element as shown e.g. in FIG. 7 fastened to the end of spring 10 or it can be formed directly on spring 10 by shaping the end of said spring, followed by coating that end with said wear-resisting and electrically non-conducting material. A nozzle orifice 9 is preferably made eccentric relative to the centre axis of nozzle body 8. When turning spring 10, the guide opening is adapted to move along an arcuate path which is eccentric relative to nozzle orifice 9. Thus, when stressed so by turning, spring 10 causes, while being relieved, the turning of welding wire 5 relative to nozzle orifice 9, in other words the penetration of a welding wire into a material abutting the nozzle orifice is the same rate the nozzle orifice is wearing away. Thus, it is possible to utilize all material surrounding the nozzle orifice. In order to maintain a suitable wire- forwarding resistance, a spring 10 surrounding said welding wire 5, as for its part extending beyond the end of nozzle body 8, is preferably made spirally shape, the length of said spiral being preferably about 1.5 turns. The embodiment shown in FIGS. 5 and 6 can also be designed by fitting spring 10 inside nozzle orifice 9, e.g. in a separate spiral groove made on the periphery of orifice 9.

I claim:

1. A current nozzle for a mig- or a mag-welding burner comprising a nozzle body having a nozzle orifice extending therethrough for the passage of welding wire, said wire having a longitudinal axis and passing longitudinally through said nozzle orifice with wear of an adjacent nozzle orifice wear surface during welding operation, and means for providing eccentric relative movement between the nozzle orifice and the wire along its longitudinal axis to maintain the wire in contact with said wear surface of the nozzle orifice.

2. A current nozzle as set forth in claim 1, wherein said nozzle body comprises two axially adjacent components connected by a threaded joint therebetween, one of said components being able to turn relative to the other of said components around an axis eccentric with respect to said nozzle orifice, and a coil spring surrounding said components and arranged to relatively turn the components about said axis.

3. A current nozzle as set forth in claim 1, wherein means for providing eccentric relative movement between the nozzle orifice and the wire comprises a coil spring surrounding said nozzle body, said spring having opposed first and second ends, said first end of said spring being fastened to said nozzle body and said second end of said spring being provided with a guide opening through which said welding wire axially extends.

4. A current nozzle as set forth in claim 3, wherein said guide opening is made of a wear-resisting and electrically non-conducting material.

5. A current nozzle as set forth in claim 1, 2, 3 or 4, wherein said nozzle orifice is positioned eccentrically relative to said nozzle body.

6. A current nozzle as set forth in claim 5, wherein said second end of said coil spring extends beyond said nozzle body and has a spiral-shape, said spiral-shaped portion of said coil spring including about 1.5 turns.

7. A current nozzle as set forth in claim 3 or 4, wherein said second end of said coil spring extends beyond said nozzle body and has a spiral-shape, said spiral-shaped portion of said coil spring including about 1.5 turns.

* * * * *